United States Patent [19]
Tubbs

[11] 3,838,713
[45] Oct. 1, 1974

[54] TRAILER TUBE AND CONNECTION
[75] Inventor: Blaine H. Tubbs, Union, Mich.
[73] Assignee: Tu-Co, Inc., Bristol, Ind.
[22] Filed: Oct. 10, 1972
[21] Appl. No.: 295,936

[52] U.S. Cl............ 138/109, 138/121, 285/DIG. 11
[51] Int. Cl............................................ F16l 11/12
[58] Field of Search ...... 138/109, 121, DIG. 9, 136; 277/9, 5; 285/DIG. 11, 108, 109, 4, 345, 374, 231

[56] References Cited
UNITED STATES PATENTS

| | | | |
|---|---|---|---|
| 377,776 | 2/1888 | Putnam............................ | 285/374 X |
| 559,305 | 4/1896 | Nies........................................ | 285/4 |
| 1,783,605 | 12/1930 | Della...................................... | 285/4 |
| 2,032,492 | 3/1936 | Nathan ............................. | 285/231 X |
| 3,234,969 | 2/1966 | DuMont................................ | 138/121 |
| 3,269,754 | 8/1966 | Berthing et al. ...................... | 285/109 |
| 3,349,805 | 10/1967 | Fried.................................... | 138/109 |
| 3,409,224 | 11/1968 | Harp et al.......................... | 138/121 X |
| 3,640,312 | 2/1972 | Bauman et al..................... | 138/121 |

FOREIGN PATENTS OR APPLICATIONS

| | | | |
|---|---|---|---|
| 800,415 | 1/1936 | France............................... | 285/345 |

*Primary Examiner*—Jerry W. Myracle
*Assistant Examiner*—Daniel M. Yasich
*Attorney, Agent, or Firm*—Hobbs & Green

[57] ABSTRACT

A tube structure for transmitting fluids from one unit to another, such as a fill opening unit to a water tank in a mobile home or recreational vehicle, the tube structure including a series of sections consisting of a convoluted flexible portion and connecting elements at the ends of said convoluted portion for receiving a cylindrical gasket which seats over a nipple or stem on the tank or filler unit. The sections are so constructed that they may be used in conjunction with other sections formed integrally therewith or cut from said other sections to form a lesser number of sections or a single section tube. A connecting element with the gasket is joined to the nipple or stem by merely slipping the element and gasket firmly onto the nipple or stem without the use of any clamping means or calking compound.

5 Claims, 5 Drawing Figures

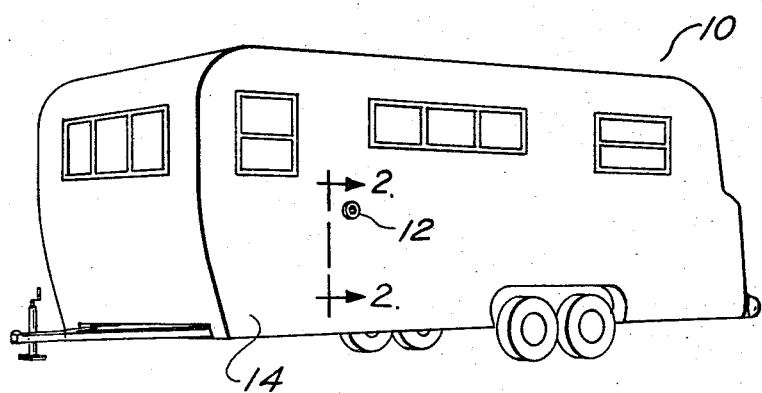
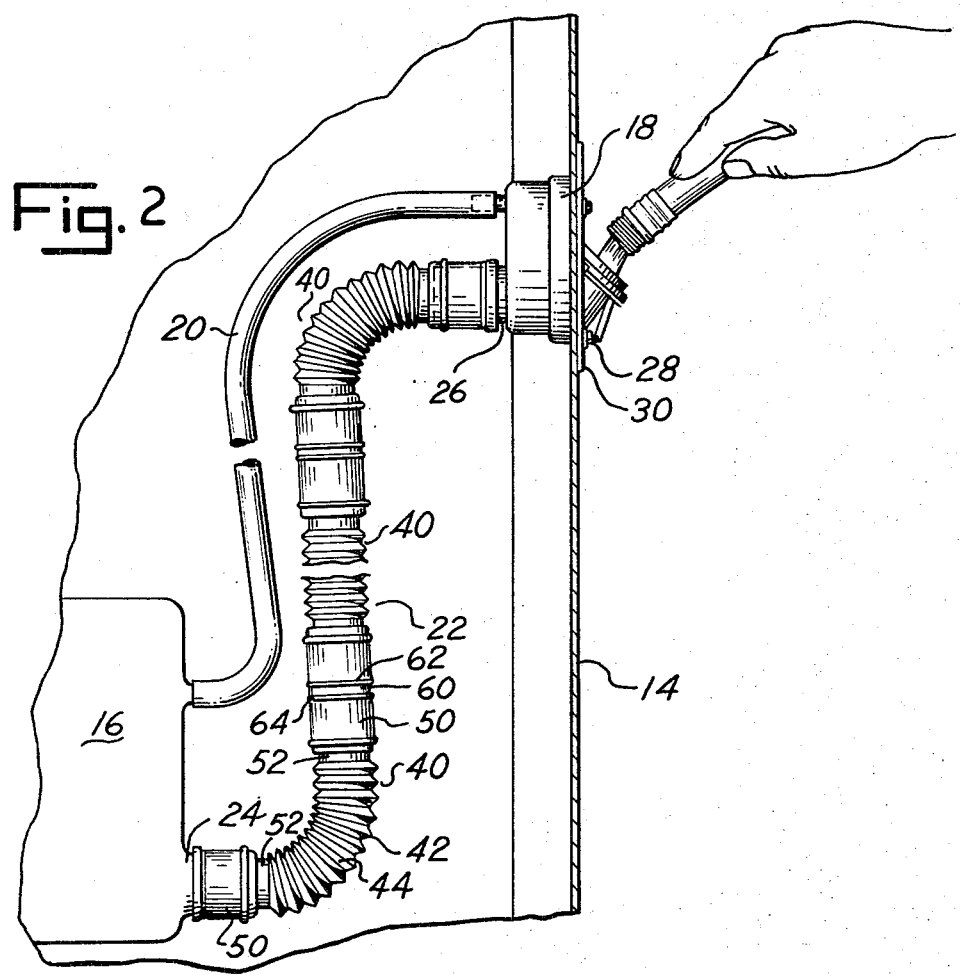

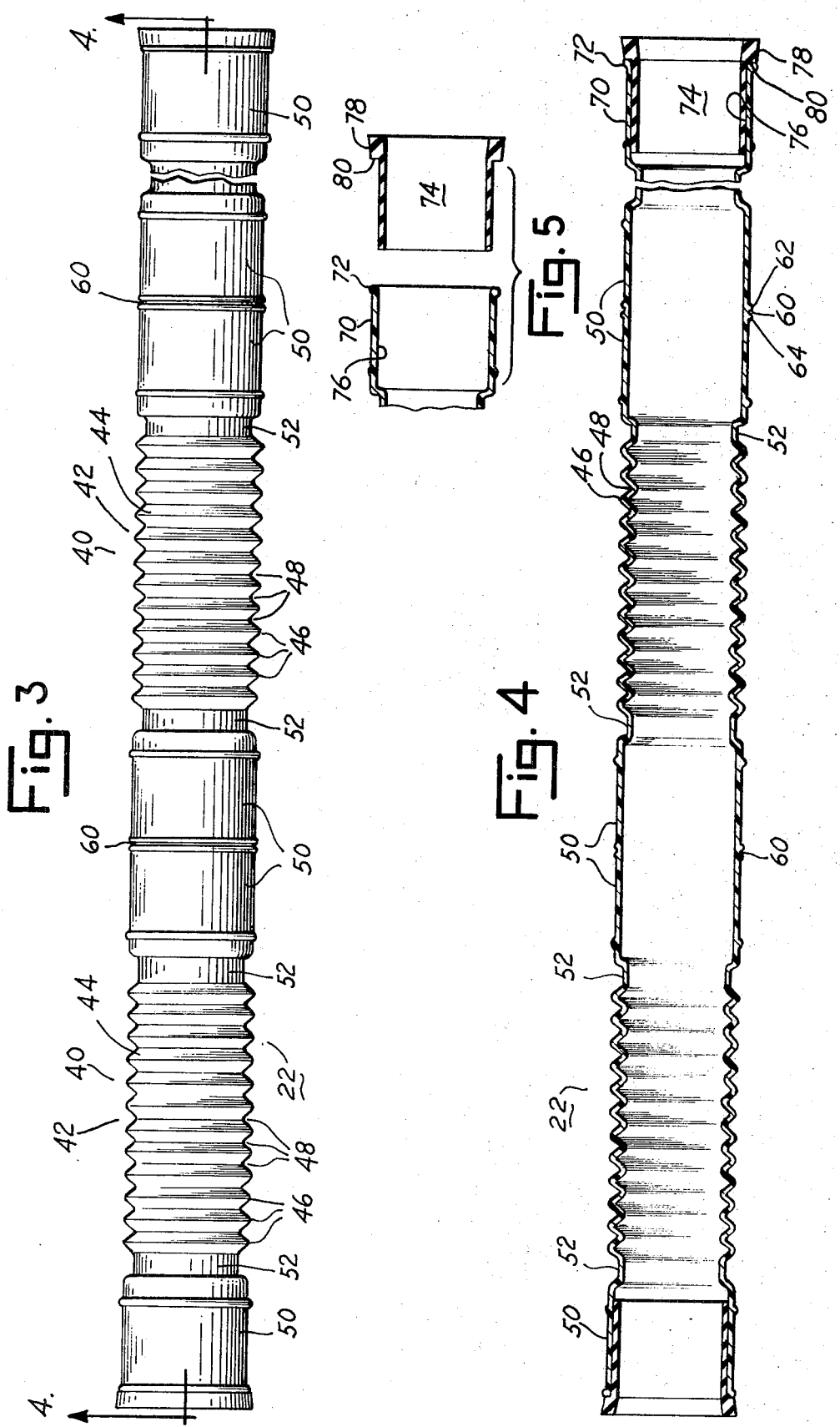

TRAILER TUBE AND CONNECTION

Recreational vehicles and mobile and motor homes are usually equipped with inside tanks for water for household use, and these tanks are normally connected by a tube to an outside fill opening unit secured into a socket in the side of the vehicle. The tubes are usually constructed of plastic or other flexible material and are clamped to nipples or short tube sections on the tank and fill opening unit. The tube and connections have been generally unsatisfactory in that the tanks and/or the fill opening unit are often difficult to reach to make the connections with the tube and to tighten the clamps, and the connections have often been insecure and required calking, and service and repair were often required in the field. Further, the plastic tubing used in the past has normally been relatively rigid in order to prevent it from collapsing after installation; however, the rigidity has interfered with the formation of effective connections with clamps and similar fixtures. It is therefore one of the principal objects of the present invention to provide a tube for connecting the water tank with the fill unit in recreational vehicles and mobile homes, which can easily be cut to sections of the required length having connections at each end for coupling with the tank and fill opening unit.

Another object of the invention is to provide plastic tube sections having preformed connections at each end which can be quickly connected to nipples or pipe sections on the water tank and fill opening unit by merely slipping the connection onto the nipple or pipe to form an effective reliable joint.

still another object of the invention is to provide a plastic tube which is so constructed and designed that it is sufficiently rigid that it will not collapse under any normal operating conditions, and yet is sufficiently flexible that it can be formed into various shapes with curves of relatively small radii to permit installing tube sections in limited areas.

A further object is to provide a tube structure consisting of a series of sections joined integrally to one another at preformed connection elements which can be readily and accurately cut to obtain tube sections of the required length with a connection element at each end, and having convolutions along its length to permit bending to various curvatures for adapting the tube to particular installations.

Additional objects and advantages of the invention will become apparent from the following description and accompanying drawings, wherein:

FIG. 1 is a perspective view of a camper showing the position of the water fill unit to which the tube structure of the present application is connected;

FIG. 2 is a fragmentary cross-sectional view of the camper illustrated in FIG. 1 showing the water tube connected to the water tank and to the water fill unit seen in FIG. 1;

FIG. 3 is a side elevational view of the tube shown in FIG. 2 before it is cut into sections of the length required to make a connection between the tank and the water fill unit;

FIG. 4 is a vertical cross-sectional view of the tube shown in FIG. 3, the section being taken on line 4 — 4 of the latter figure; and FIG. 5 is an exploded cross-sectional view of one of the connections on the end of a tubular section illustrated in the preceding figures.

Referring more specifically to the drawings and to FIG. 1 in particular, numeral 10 indicates generally a camper which is used here merely for the purpose of illustrating a type of vehicle for which the present tube structure is primarily intended. However, the tube is suitable for use in a variety of different places, including mobile homes and recreational vehicles, and it is capable of being used on other types of vehicles and in homes of standard construction. Numeral 12 indicates the water fill unit in side 14 of the camper. The fill unit may be located at various places, depending upon the arrangement of the internal appurtenances which may determine the position of the tank in the camper, and the arrangement of the plumbing serving the kitchen and bathroom. However, the water fill unit is normally placed in the proximity of and above the tank as illustrated in FIG. 2. The present tube can also be used effectively in different types of installations and arrangements of the tank relative to the fill opening unit.

The installation illustrated in FIG. 2 includes a water fill tank 16, water fill unit 18, air vent tube 20 connecting the upper part of the tank with a vent opening in the fill unit, and the present tube 22 connecting the water tank with the water fill unit. The lower end of the tube is connected to the tank at a nipple or stem 24 and to the water fill unit at a nipple or stem 26. The water fill unit is inserted in an opening in the side of the vehicle and is secured thereto by a plurality of screws 28 extending through an annular flange 30 on the water fill unit, thus rigidly securing the unit in place in the opening in side 14.

Tube 22 consists essentially of a series of identical sections indicated by the numeral 40, each section having a center portion 42 with convolutions 44 forming ridges 46 and grooves 48. These convolutions permit the tube to be easily flexed or bent in any direction to conform to the required installation, as illustrated in FIG. 2 where the convoluted portion is shown bent at a rather sharp right angle at the tank and at the water fill unit. At each end of the section are identical connection elements 50 which are joined integrally to the convoluted portion by a small cylindrical annular portion 52. The convoluted and cylindrical portions and the connecting elements are integral with one another and form a continuous section. The series of sections which are joined to one another by an annular portion 60 are readily identified by two annular ribs 62 and 64 on opposite sides of the annular portion. Since sections 40 are relatively short, several sections may be required to make a connection between the tank and the water fill unit as illustrated in FIG. 2. The tube is cut to the required length by cutting annular portion 60 with a knife or other suitable sharp instrument to sever one section from another to form the ends of the tube.

When the sections have been severed from one another, each section contains a connecting element 50 at each end, consisting of a cylindrically shaped member 70 having an annular bead 72 formed by ribs 62 or 64. The connection with nipples 24 or 26 is formed by the use of a gasket or seal 74 of rubber or rubber-like material having a cylindrical portion which seats in the cylindrical member 76 of element 50 and includes a flange 78 joined integrally to the cylindrical member and being somewhat larger in diameter to form an inwardly facing shoulder 80 for seating on the end of the element adjacent bead 72. The gasket can be readily inserted in the connection element since it is flexible and can be deformed sufficiently to press it inwardly without the use of any special tools or equipment.

The tube is preferably constructed of relatively rigid but flexible plastic which is rendered flexible by the convoluted portion 42 and which will not collapse under normal operating conditions. Polyethylene is satisfactory for the purpose of forming the present tube; however, other plastics of well-known composition may be used provided they have sufficient rigidity to form a non-collapsible tube with sufficient flexibility at the convoluted portions that it can be formed into the various shapes to make the required installations.

In making an installation using the present tube, the required length of tubing is cut, normally including several sections 40, at one of the annular portions 60, thus providing the length of tubing with connecting elements 50 at each end. A rubber gasket 74 is then inserted in each connector element in the manner shown in FIG. 4, and the end of the tube with the gasket is slipped onto stems 24 and 26 until each connector element and gasket seats firmly secured to the stem. Preferably, in order to assist in slipping the gasket onto the stem, the gasket is wetted internally by a mild soap solution or other suitable lubricant which permits the gasket to slip easily onto the surface of the stem and thereafter to firmly grip the stem and form a seal therewith. No clamps, calking compound or other securing means are required to retain the connector elements 50 and the gasket therein on the nipple or stem thereafter.

Since the tube will flex readily as a result of the accordian action of the convoluted portions 42, the tube can be installed in places of limited area and places which require substantial curvature in the tube to connect the tank with the water fill unit. Since the installation is made by merely slipping the connecting elements 50 on the respective nipple or stem along with the gasket of each element, the tube can easily and effectively be installed in places difficult to reach, since no tools or special manipulations are required to complete the installation.

While the present invention has been described with reference to recreational vehicles and mobile homes, the tubing may be used for other types of installations and for various other purposes. Only one embodiment of the tube having a plurality of sections and intervening connector elements, has been described in detail herein; however, various changes and modifications may be made without departing from the scope of the invention.

I claim:

1. A tube structure having a plurality of end connection elements for transmitting fluid from one unit to another, said units having a stem extending therefrom for connection with the tube structure, said end connection elements selectively formed into joint elements comprising a series of similar connected sections of relatively rigid plastic material integrally joined to one another, each section having a convoluted portion for facilitating flexing of the section, and the joint forming elements being of a cylindrical shape and substantially rigid construction and disposed at opposite ends of said convoluted portion, the joint forming elements integrally connected to and severable from the joint forming element of the adjacent tube section of said series and each of said integrally connected joint forming elements having a rib at the end thereof adjacent to the next succeeding element section, and an annular portion disposed between the adjacent ribs for defining the area to be cut when the two sections are separated.

2. A tube structure as defined in claim 1 in which a seal is disposed in each joint- forming element on each end of a selected length of tube section.

3. A tube structure as defined in claim 2 in which said seal consists of a hollow cylindrical portion seating in the joint forming element and having an enlarged outer end providing a shoulder for seating against the end of the element.

4. A tube structure as defined in claim 1 in which said convoluted portion consists of a series of internal and external annular ribs and grooves.

5. A tube structure as defined in claim 1 in which the tube is constructed of relatively rigid but flexible plastic material and the convoluted portion and connecting joint forming elements are formed integrally to one another to form a continuous tube structure.

* * * * *